(12) United States Patent
Westerhoff et al.

(10) Patent No.: US 12,722,444 B2
(45) Date of Patent: Sep. 1, 2026

(54) TUBULAR STABILIZER BAR FOR A VEHICLE CHASSIS, AND VEHICLE CHASSIS COMPRISING THE TUBULAR STABILIZER BAR

(71) Applicants: ThyssenKrupp Federn und Stabilisatoren GmbH, Hagen (DE); thyssenkrupp AG, Essen (DE)

(72) Inventors: Karsten Westerhoff, Hattingen (DE); Frank Schneider, Dortmund (DE); Diana Frericks, Hagen (DE); Mario Gropp, Ilsenburg (DE); Goekhan Bolat, Eschen (LI)

(73) Assignees: ThyssenKrupp Federn und Stabilisatoren GmbH, Hagen (DE); thyssenkrupp AG, Essen (DE)

( * ) Notice: Subject to any disclaimer, the term of this patent is extended or adjusted under 35 U.S.C. 154(b) by 387 days.

(21) Appl. No.: 18/292,813

(22) PCT Filed: Jul. 14, 2022

(86) PCT No.: PCT/EP2022/069820
§ 371 (c)(1),
(2) Date: Jan. 26, 2024

(87) PCT Pub. No.: WO2023/006442
PCT Pub. Date: Feb. 2, 2023

(65) Prior Publication Data

US 2024/0270042 A1 Aug. 15, 2024

(30) Foreign Application Priority Data

Jul. 27, 2021 (DE) ..................... 10 2021 208 073.1

(51) Int. Cl.
*B60G 21/055* (2006.01)
*C21D 1/04* (2006.01)
(Continued)

(52) U.S. Cl.
CPC ............ *B60G 21/055* (2013.01); *C21D 1/04* (2013.01); *C21D 1/18* (2013.01); *C21D 6/005* (2013.01);
(Continued)

(58) Field of Classification Search
None
See application file for complete search history.

(56) References Cited

U.S. PATENT DOCUMENTS 5,236,520 A * 8/1993 Gallagher, Jr. .......... C21D 8/06 72/364
7,828,918 B2 * 11/2010 Vondracek .............. C21D 8/06 148/598
(Continued)

FOREIGN PATENT DOCUMENTS

DE 198 41 295 A1 3/2000
EP 3 358 028 A1 8/2018
(Continued)

OTHER PUBLICATIONS

English Translation of International Search Report issued in PCT/EP2022/069820, dated Oct. 3, 2022.

*Primary Examiner* — Seth Dumbris
(74) *Attorney, Agent, or Firm* — thyssenkrupp North America, LLC

(57) ABSTRACT

The present invention relates to a tubular anti-roll bar for a vehicle chassis, produced from a metal tubular body, comprising a torsion spring portion, two limbs bent off from the torsion spring portion and a bending portion, arranged between the torsion spring portion and the respective bent limb and having an inside bending radius (IB) and an outside bending radius (OB), wherein the tubular anti-roll bar has a structure with grains with a grain size distribution and an average grain size, wherein the structure has a ratio between the average grain size in the bending portion of the inside
(Continued)

bending radius (IB) in relation to the average grain size in the torsion spring portion in the range of 73% to 77%.

7 Claims, 4 Drawing Sheets

(51) Int. Cl.

| | |
|---|---|
| ***C21D 1/18*** | (2006.01) |
| ***C21D 6/00*** | (2006.01) |
| ***C21D 9/08*** | (2006.01) |
| ***C22C 38/00*** | (2006.01) |
| ***C22C 38/04*** | (2006.01) |

(52) U.S. Cl.

CPC .............. *C21D 9/08* (2013.01); *C22C 38/002* (2013.01); *C22C 38/04* (2013.01); *B60G 2202/135* (2013.01); *B60G 2206/012* (2013.01); *B60G 2206/427* (2013.01); *C21D 2211/008* (2013.01)

(56) References Cited

U.S. PATENT DOCUMENTS

| | | | | |
|---|---|---|---|---|
| 2004/0139780 | A1 | 7/2004 | Cai et al. | |
| 2005/0214560 | A1* | 9/2005 | Yue | B60G 11/20 428/614 |
| 2017/0066299 | A1* | 3/2017 | Mucher | C21D 1/18 |
| 2017/0275721 | A1* | 9/2017 | Lechner | C21D 9/525 |
| 2018/0305780 | A1 | 10/2018 | Aratani et al. | |
| 2021/0268862 | A1 | 9/2021 | Aratani et al. | |

FOREIGN PATENT DOCUMENTS

| | | | |
|---|---|---|---|
| EP | 3 816 313 | A1 | 5/2021 |
| JP | H0789325 | A | 4/1995 |
| JP | 2019059980 | A | 4/2019 |
| WO | 2020235756 | A1 | 11/2020 |

* cited by examiner

TUBULAR STABILIZER BAR FOR A VEHICLE CHASSIS, AND VEHICLE CHASSIS COMPRISING THE TUBULAR STABILIZER BAR

CROSS REFERENCE TO RELATED APPLICATIONS

This application is a U.S. National Stage Entry of International Patent Application Serial Number PCT/EP2022/069820, filed Jul. 14, 2022, which claims priority to German Patent Application No. DE 10 2021 208 073.1, filed Jul. 27, 2021, the entire contents of both of which are incorporated herein by reference.

FIELD

The present disclosure generally relates to a tubular anti-roll bar for a vehicle chassis and a vehicle chassis comprising the tubular anti-roll bar.

BACKGROUND

Tubular anti-roll bars made from formed steel tube are known in multiple forms in the prior art. Tubular anti-roll bars are also referred to as torsion bars, stabilization torsion bars or torsion spring bars. Steel springs and tubular anti-roll bars are used, in particular, in motor vehicles, wherein steel springs are used, for example, in spring/damping systems for absorbing shocks caused by uneven road surfaces and tubular anti-roll bars are used for stabilizing against rolling when cornering in a motor vehicle, when driving a motor vehicle over varying road surfaces and in the case of uneven road surfaces. Such anti-roll bars are conventionally arranged in the region of the front and the rear axle and usually extend over the entire width of the vehicle. Forming the steel tube or steel wire into springs and torsion bars may take place according to forming procedures known in the prior art. Before or after this forming, the steel tube or the steel wire may undergo various preparatory steps, which influence the spring properties and strength properties and improve certain other usage properties of a material. In this regard, higher-strength spring and/or torsion bars can be produced with comparatively low material usage and therefore with a low weight and low material costs. In this case, tubular springs have a relatively low weight compared to bar springs, with the same spring properties; the stiffness and flexural strength in tubular anti-roll bars depends on the diameter and the wall thickness. However, increasing the diameter-wall thickness ratio to further save on weight is only possible to a limited extent owing to the higher internal stresses arising during the forming process and during operation of the component. The properties of tubular anti-roll bars are therefore limited to a narrow range of geometrical dimensions and the resultant spring properties and the formability of the steel tube or steel wire is limited in several forming procedures known in the prior art. In particular, the parameters “strength” and “durability” are related to the forming capability and the service life of a tubular anti-roll bar.

Thus a need exists to provide an improved tubular anti-roll bar for vehicles and/or an improved vehicle chassis comprising a tubular anti-roll bar, in which the above-mentioned disadvantages are avoided. In particular, with this improved tubular anti-roll bar for vehicles and/or with the improved vehicle chassis, the aim is to enable an increase in the service life, in particular in the service-life values in dynamic tests, and to reduce the variation in service-life results.

BRIEF DESCRIPTION OF THE FIGURES

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
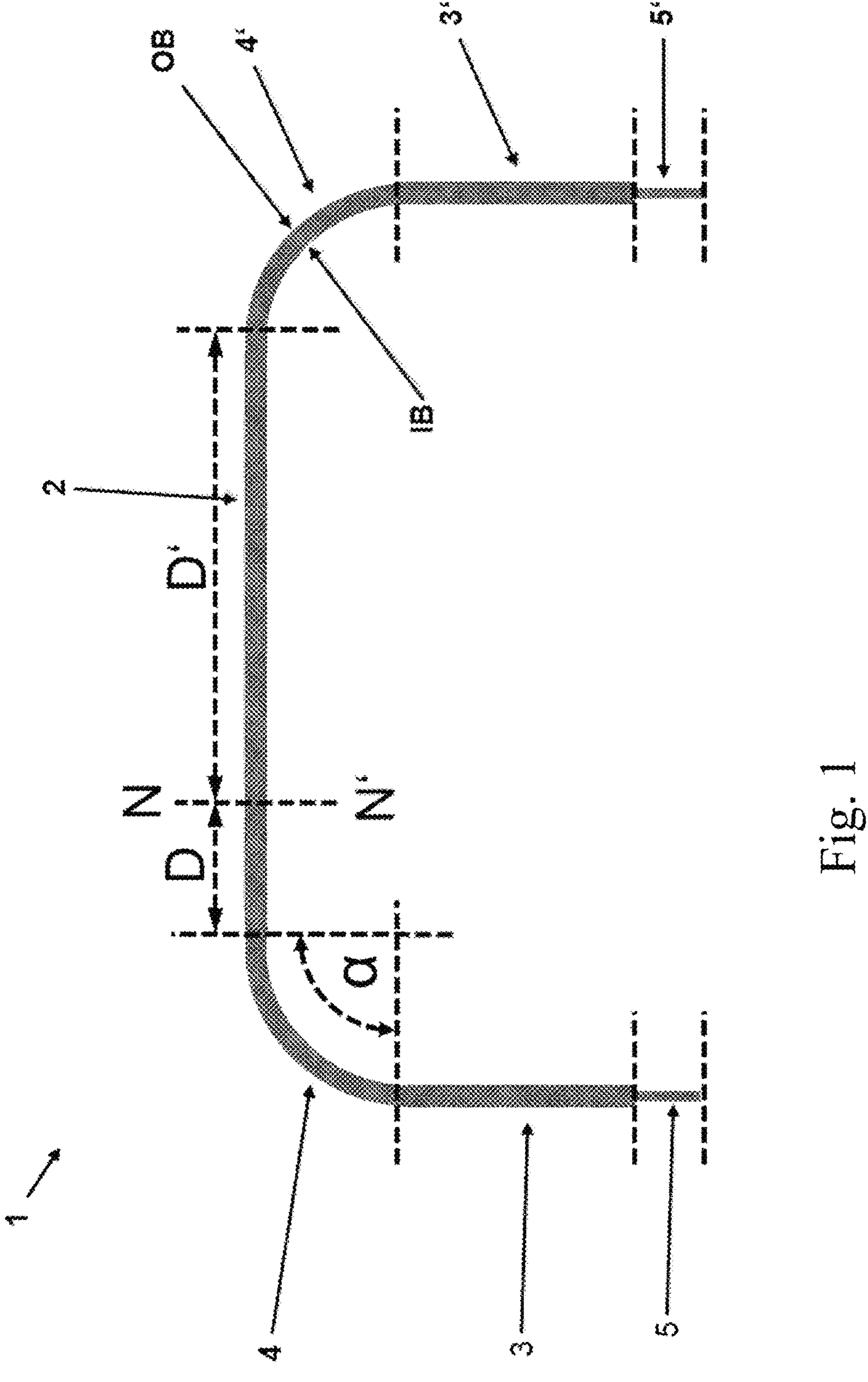
FIG. 1 shows a schematic representation view of a tubular anti-roll bar according to the prior art.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting “a” element or “an” element in the appended claims does not restrict those claims to articles, apparatuses, systems, methods, or the like having only one of that element, even where other elements in the same claim or different claims are preceded by “at least one” or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The tubular anti-roll bar according to the disclosure for a vehicle chassis has the advantage of a longer service life compared to conventional tubular anti-roll bars. Moreover, in the case of the tubular anti-roll bar according to the disclosure, it is possible to establish properties, in particular the stiffness and flexural strength, based on requirements.

The subject matter of the disclosure is, therefore, a tubular anti-roll bar for a vehicle chassis, produced from a metal tubular body, comprising a torsion spring portion, two limbs bent off from the torsion spring portion and a bending portion, arranged between the torsion spring portion and the respective bent limb and having an inside bending radius and an outside bending radius, wherein the tubular anti-roll bar has a structure, in particular a steel structure, for example an iron-carbon alloy, for example a microstructure with grains, in particular a granular structure with a grain size distribution and an average grain size, in particular an average value of the grain size distribution, wherein the structure has a ratio between the average grain size, in particular after tempering, in the bending portion of the inside bending radius, in particular in the vertex of the bending portion of the inside bending radius, in relation to the average grain size in the torsion spring portion, in particular in the center of the torsion spring portion, in the range of 70% to 99% or 70% to 90%, preferably in the range of 71% to 79%, particularly preferably in the range of 72% to 78%, especially preferably in the range of 73% to 77%.

A further subject matter of the disclosure is a vehicle chassis, comprising a tubular anti-roll bar for a vehicle chassis, produced from a metal tubular body, comprising a torsion spring portion, two limbs bent off from the torsion spring portion and a bending portion, arranged between the torsion spring portion and the respective bent limb and having an inside bending radius and an outside bending radius, wherein the tubular anti-roll bar has a structure, in particular a steel structure for example an iron-carbon alloy, for example a microstructure with grains, in particular a granular structure with a grain size distribution and an average grain size, in particular an average value of the grain size distribution, wherein the structure has a ratio between the average grain size, in particular after tempering, in the bending portion of the inside bending radius, in particular in the vertex of the bending portion of the inside bending radius, in relation to the average grain size in the torsion spring portion, in particular in the center of the torsion spring portion, in the range of 70% to 99% or 70% to 90%, preferably in the range of 71% to 79%, particularly preferably in the range of 72% to 78%, especially preferably in the range of 73% to 77%.

A further subject matter of the disclosure is the use of a tubular anti-roll bar for a vehicle chassis, produced from a metal tubular body, comprising a torsion spring portion, two limbs bent off from the torsion spring portion and a bending portion, arranged between the torsion spring portion and the respective bent limb and having an inside bending radius and an outside bending radius, wherein the tubular anti-roll bar has a structure, in particular a steel structure, for example an iron-carbon alloy, for example a microstructure with grains, in particular a granular structure, with a grain size distribution and an average grain size, in particular an average value of the grain size distribution, wherein the structure has a ratio between the average grain size, in particular after tempering, in the bending portion of the inside bending radius, in particular in the vertex of the bending portion of the inside bending radius, in relation to the average grain size in the torsion spring portion, in particular in the center of the torsion spring portion, in the range of 70% to 99% or 70% to 90%, preferably in the range of 71% to 79%, particularly preferably in the range of 72% to 78%, especially preferably in the range of 73% to 77%, for arrangement on a vehicle chassis.

The disclosure may be realized in a tubular anti-roll bar of a vehicle chassis comprising a tubular anti-roll bar and by the use of a tubular anti-roll bar for arrangement on a vehicle chassis.

Within the context of the present disclosure, a tubular anti-roll bar is understood to be a component comprising at least one metal tubular element, in which, when firmly clamped at both ends, the fastened ends execute a pivotal movement with respect to each other about the tubular anti-roll bar axis. In particular, the mechanical strain is essentially produced by a torque acting tangentially to the tubular anti-roll bar axis. Tubular anti-roll bars are also understood to include, for example, an angled torsion bar, a torsion spring, a torsion bar spring or a combination of these.

In a further embodiment of the disclosure, the metal tubular body comprises a manganese-boron-steel composite with a carbon content in the range of 0.2% by weight to 0.42% by weight in relation to the total weight of the manganese-boron-steel composite, preferably in the range of 0.24% by weight to 0.4% by weight in relation to the total weight of the metal tubular body, in particular the manganese-boron-steel composite. By way of example, the metal tubular body, in particular the manganese-boron-steel composite, is selected from a group of boron-alloyed tempered steels according to DIN EN 10083, for example 20MnB5, 26MnB5, 34MnB5, 40MnB5.

According to a further embodiment of the disclosure, the average grain size, in particular after tempering, in the bending portion is greater in the outside bending radius than in the inside bending radius. In particular, the structure has a ratio between the average grain size (in particular after tempering) in the bending portion of the outside bending radius (OB) (in particular in the vertex of the bending portion of the outside bending radius (OB)) in relation to the average grain size in the torsion spring portion (2) (in particular in the center of the torsion spring portion) in the range of 78% to 105%, preferably in the range of 80% to 102%, particularly preferably in the range of 83% to 100%, especially preferably in the range of 85% to 98%.

According to a further embodiment of the disclosure, the bending portion has a bending angle between the torsion spring portion and the respective bent limb in the range of 30° to 105°, preferably in the range of 35° to 95°, particularly preferably in the range of 45° to 90°.

Within the context of the present disclosure, a bending angle is understood to be the path, in particular the measured path, covered by the positionally altered limb of the profile during bending. It is the angle between the originally extended position of the inside edge of the limb and its end position.

In a further embodiment of the disclosure, the tubular anti-roll bar is tempered by electrical resistance heating; in particular the torsion spring portion, the two limbs bent off from the torsion spring portion and the bending portion arranged between the torsion spring portion and the respective bent limb are tempered at the same time, in particular tempered in one process step.

According to a further embodiment of the disclosure, the structure of the tubular anti-roll bar in part comprises a martensitic structure; in particular, the bending portion comprises a martensitic texture; for example the bending portion is made from a martensitic structure.

In FIG. 1, a plan view of a tubular anti-roll bar 1 having a torsion spring portion 2 and two bent limbs 3, 3', which end in end portions 5, 5' (illustrated by dashed lines), is shown in a schematic representation according to the prior art. A respective bending portion 4, 4' (demarcated by dashed lines) is shown in the region between the torsion spring portion 2 and the limbs 3, 3', which are each bent off from the torsion spring portion 2 at a respective bending angle $\alpha$ (as shown by dashed lines). An inside bending radius IB and an outside bending radius OB are shown on the respective bending portion 4, 4'. The torsion spring portion is shown by dashed lines according the arrangement of a section N, N' at distances D, D'.

Figure 2:
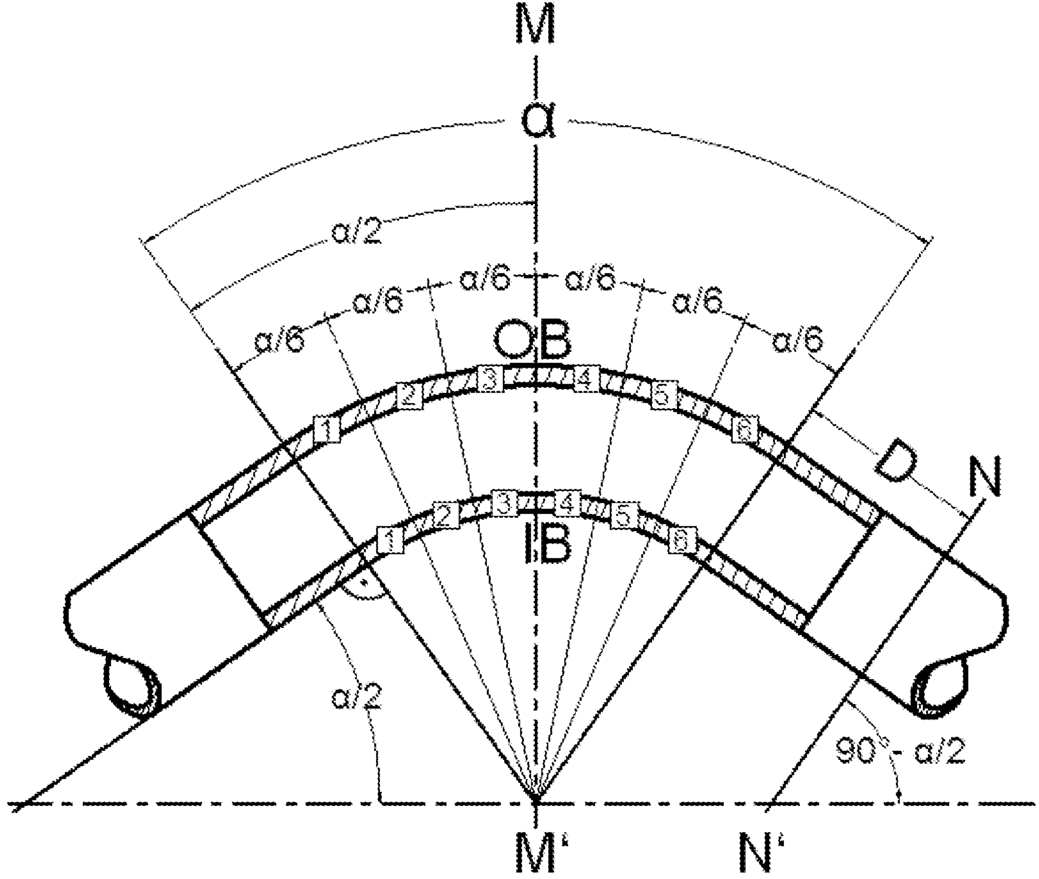
FIG. 2 shows a longitudinal section through a bending portion of a tubular anti-roll bar according to embodiments of the disclosure.

A longitudinal section through a bending portion 4, 4' of the tubular anti-roll bar 1 is shown in a schematic representation in FIG. 2, with the bending angle $\alpha$ and the inside bending radius IB and the outside bending radius OB. Sampling points are shown in framed squares numbered 1 to 6. Sections M-M' and N'N are shown in a schematic representation.

Figure 3:
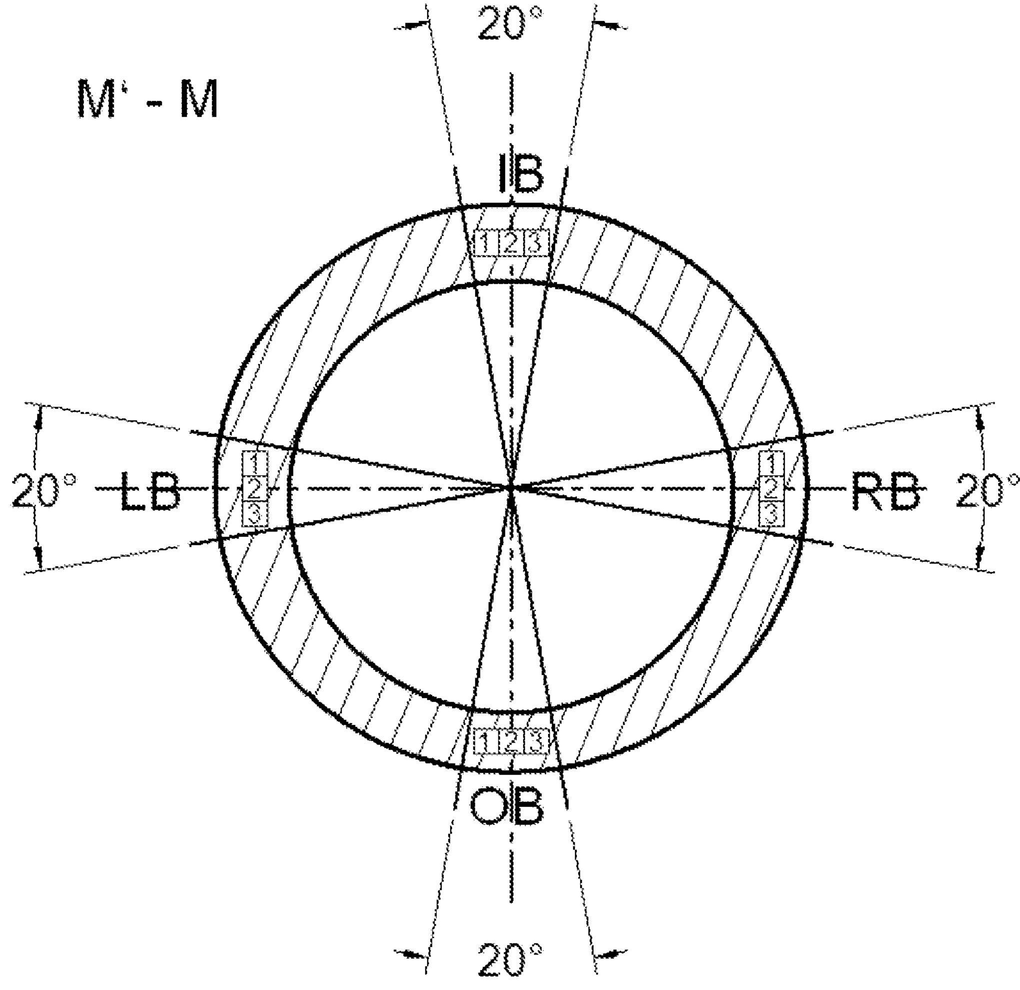
FIG. 3 shows a cross section through a bending portion of a tubular anti-roll bar according to the disclosure.

In FIG. 3, the section M-M' through a bending portion 4, 4' of the tubular anti-roll bar 1 is shown in a schematic representation, with the inside bending radius IB and the outside bending radius OB and a left bending radius LB and a right bending radius RB. The respective sampling points are shown in framed squares numbered 1 to 3.

Figure 4:
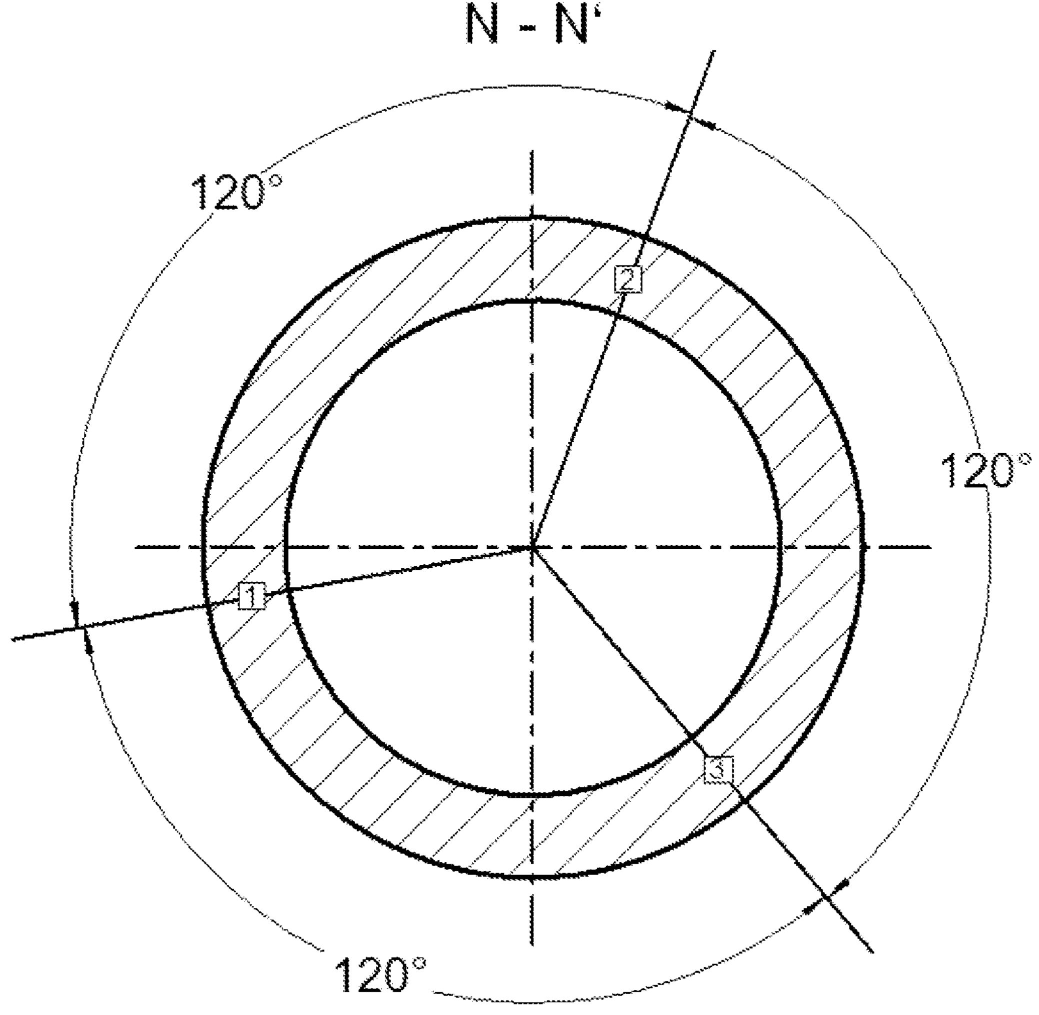
FIG. 4 shows a cross section through a torsion spring portion of a tubular anti-roll bar according to the disclosure.

In FIG. 4, the section N-N' through a torsion spring portion 2 of the tubular anti-roll bar 1 is shown in a schematic representation. Sampling points are shown in framed squares numbered 1 to 3.

EXAMPLES

1 Grain Size Determination

1.1 Test Parameters

| | |
|---|---|
| Sampling | Limb radius 1 transverse<br>Limb radius 1 longitudinal<br>Back region |
| Microscope | Leica Aristomet |
| Software | dhs image database,<br>module for grain size<br>determination by PixelFerber |
| Standard | DIN/ASTM |
| Method | Circular section method |

1.2 Operating Procedure

Sampling took place in the first limb radius of the left side. To this end, two tubular anti-roll bars were provided for each resistance heating method. Therefore, a transverse ground section and a longitudinal ground section could be removed in each case. As reference, a transverse ground section was moreover removed in the neutral back region. The sampling/sample preparation is described in note form below:

Remove the depicted cutting points M-M', N-N' (distance D, D'>50 mm) with a band saw, Pre-grind the coarse cutting surface using a belt sander, which has sandpaper with grain size 80, Further wet-grind by hand with sandpaper with grain sizes 120, 220, 500, 1200. After each sandpapering, the surface of the sample should be thoroughly cleaned to avoid dirt being transferred to the next, finer sandpaper.

Polish the ground surfaces with a suitable polishing cloth and 3 μm diamond suspension. Polishing takes place until a reflective surface appears.

A martensitic structure is present in the tempered tubular anti-roll bars, and it is therefore advisable to subject the polished samples to heat treatment. This is intended to oxidize the grain boundaries and facilitate etching of the grain boundaries. Possible furnace settings may be applied as follows:

Temperature: 480-550° C.,

Holding time: 80-100 min.

After the heat treatment, the sample may be quenched directly in water. The polished surface now has an oxide layer which is carefully removed by polishing.

PLEASE NOTE: Complete removal of the oxide layer is advisable!

When generating the grain boundaries, repeated polishing and etching may be necessary. The effective range of oxidation through heat treatment is very superficial and could be evened out by too strong polishing.

Two approved agents may be used for the etching.

Bechtet-Beaujard is brought to a temperature of 60-70° ° C. The sample is etched for 15-20 min, Heating is not required with the etchant HA. The sample is also etched for 15-20 min here.

After etching, the acid is thoroughly removed from the sample using water. The surface appears copper or black, depending on the etchant. This layer is removed using ethanol and a cotton swab, applying strong pressure. Then, clean with water again, remove the water using ethanol and dry the sample in an air flow.

The sample may now be observed under the microscope. If the result is not yet satisfactory, the polishing and etching are repeated until the grain boundaries are visible.

Suitable magnification should be selected to capture images of the grain boundaries.

PLEASE NOTE: In this report, a consistent magnification was selected to enable comparison of the longitudinal ground sections.

If an image is captured with the desired magnification, the grain size is determined using the circular section method of DIN EN ISO 643. This should be established manually depending on the image quality.

1.3 Summary of the Test Results in the Transverse Ground Section

| | Electrical resistance heating method 1 | | Electrical resistance heating method 2 | |
|---|---|---|---|---|
| Testing point/ grain size | Measurement | Average value | Measurement | Average value |
| Back | 12.53/11.02/10.23 | 11.26 | 9.98/9.64/11.32 | 10.31 |
| SR1 Inside bending radius | 8.08/8.24/8.32 | 8.21 | 6.89/7.29/7.13 | 7.10 |
| SR1 Outside bending radius | 11.58/11.02/11.09 | 11.23 | 11.40/11.49/11.58 | 11.49 |
| SR1 left | 9.87/10.28/9.46 | 9.87 | 9.27/8.67/10.03 | 9.32 |
| SR1 right | 9.92/10.08/9.92 | 9.97 | 9.64/10.03/9.92 | 9.86 |

1.4 Comparison of the Grain Size in the Inside Bending Radius

Images were captured at 200× magnification at 3 points (c.f. FIG. 2, for example) in the region of the inside bending radius

| Arrangement/grain size | 1 | 2 | 3 |
|---|---|---|---|
| ELECTRICAL RESISTANCE HEATING METHOD 1 | 8.08 | 8.24 | 8.32 |
| ELECTRICAL RESISTANCE HEATING METHOD 2 | 6.89 | 7.29 | 7.13 |

1.5 Comparison of the Grain Size in the Outside Bending Radius

Images were captured at 500× magnification at 3 points (c.f. FIG. 2, for example) in the region of the outside bending radius

| Arrangement/grain size | 1 | 2 | 3 |
|---|---|---|---|
| ELECTRICAL RESISTANCE HEATING METHOD 1 | 11.58 | 11.02 | 11.09 |
| ELECTRICAL RESISTANCE HEATING METHOD 2 | 11.40 | 11.49 | 11.58 |

1.6 Comparison of the Grain Size in the Left/Right Transition Regions

Images were captured at 500× magnification at 3 points in each case (c.f. FIG. 2, for example) in the left and right transition region.

| Arrangement/grain size at the measuring position | 1 | 2 | 3 |
|---|---|---|---|
| ELECTRICAL RESISTANCE HEATING METHOD 1 Left | 9.87 | 10.28 | 9.46 |
| ELECTRICAL RESISTANCE HEATING METHOD 2 Left | 9.27 | 8.67 | 10.03 |
| ELECTRICAL RESISTANCE HEATING METHOD 1 Right | 9.92 | 10.08 | 9.92 |
| ELECTRICAL RESISTANCE HEATING METHOD 2 Right | 9.64 | 10.03 | 9.92 |

1.7 Comparison of the Grain Sizes in the Back Region

Images were captured at 500× magnification at 3 points in each case (c.f. FIG. 3, for example) in the left and right back region Example for the Positions on the Transverse Ground Section

| Arrangement/grain size at the measuring position | 1 | 2 | 3 |
|---|---|---|---|
| ELECTRICAL RESISTANCE HEATING METHOD 1 | 12.53 | 11.02 | 10.23 |
| ELECTRICAL RESISTANCE HEATING METHOD 2 | 9.98 | 9.64 | 11.32 |

1.8 Comparison of the Grain Sizes in the Longitudinal Extent on the Inside Bending Radius Images were captured at 500× magnification at 6 points (c.f. FIG. 2, for example) along the longitudinal ground section in the inside bending radius.

| | Arrangement/grain size at the measuring position | | | | | |
|---|---|---|---|---|---|---|
| | 1 | 2 | 3 | 4 | 5 | 6 |
| ELECTRICAL RESISTANCE HEATING METHOD 1 | 9.58 | 8.50 | 8.23 | 8.59 | 9.33 | 9.46 |
| ELECTRICAL RESISTANCE HEATING METHOD 2 | 8.50 | 7.92 | 6.59 | 7.20 | 7.92 | 8.23 |

1.9 Comparison of the Grain Sizes in the Longitudinal Extent on the Outside Bending Radius Images were captured at 500× magnification at 6 points (c.f. FIG. 2, for example) along the longitudinal ground section in the inside bending radius.

| | 1 | 2 | 3 | 4 | 5 | 6 |
|---|---|---|---|---|---|---|
| ELECTRICAL RESISTANCE HEATING METHOD 1 | 10.67 | 10.59 | 10.23 | 11.33 | 10.37 | 10.87 |
| ELECTRICAL RESISTANCE HEATING METHOD 2 | 10.08 | 11.02 | 10.91 | 10.50 | 10.55 | 10.79 |

2 Result

From the test results, it is possible to make the following statements:

In the back region, the tempering via the ELECTRICAL RESISTANCE HEATING METHOD 1 arrangement shows, on average, a grain refinement by a factor of ca. 1.

In the inside bending radius, the tempering via the ELECTRICAL RESISTANCE HEATING METHOD 1 arrangement shows, on average, a grain refinement by a factor of ca. 1.

The grain sizes in the outside bending region are comparable.

The transition regions are comparable. Both have a mix of coarse and fine grains.

In the longitudinal ground section of the inside bending radius, the tempering via the ELECTRICAL RESISTANCE HEATING METHOD 1 arrangement shows, in places, a grain refinement by a factor of ca. 2.

The outside bending radii in the longitudinal ground section are comparable.

COMMERCIAL APPLICABILITY

Tubular anti-roll bars of the above-described type are used in the production of vehicles, in particular the chassis of motor vehicles.

LIST OF REFERENCE SIGNS

1=Tubular anti-roll bar
2=Torsion spring portion
3, 3'=Limb
4, 4=Bending portion
5,5=End portion
IB=Inside bending radius
OB=Outside bending radius
α=Bending angle
LB=Left bending radius of a cross section
RB=Right bending radius
M-M'=Section, schematic representation
N-N'=Section, schematic representation
D, D'=Distances of a section N-N' from the bending portions 4, 4'.

What is claimed is:

1. A tubular anti-roll bar for a vehicle chassis comprising:
a torsion spring portion;
two limbs bent off from the torsion spring portion; and
a bending portion, arranged between the torsion spring portion and the respective bent limb having an inside bending radius (IB) and an outside bending radius (OB), having a structure with grains with a grain size distribution and an average grain size, wherein the structure has a ratio between the average grain size in the bending portion of the inside bending radius (IB) in relation to the average grain size in the torsion spring portion in the range of 70% to 99%.

2. The tubular anti-roll bar of claim 1, wherein the metal tubular body comprises a manganese-boron-steel composite with a carbon content in the range of 0.2% by weight to 0.42% by weight in relation to the total weight of the manganese-boron-steel composite.

3. The tubular anti-roll bar of claim 1, wherein the average grain size in the bending portion in the outside bending radius (OB) is greater than in the inside bending radius (IB).

4. The tubular anti-roll bar of claim 1, wherein the bending portion has a bending angle between the torsion spring portion and the respective bent limb in the range of 30° to 105.

5. The tubular anti-roll bar of claim 1, wherein the tubular anti-roll bar is tempered by electrical resistance heating, wherein the torsion spring portion, the two limbs bent off from the torsion spring portion and the bending portion arranged between the torsion spring portion and the respective bent limb are tempered at the same time.

6. The tubular anti-roll bar of claim 1, wherein the structure of the tubular anti-roll bar includes a martensitic structure.

7. A vehicle chassis comprising the tubular anti-roll bar of claim 1.

* * * * *